US012656888B2

(12) United States Patent
Yamada

(10) Patent No.: US 12,656,888 B2
(45) Date of Patent: Jun. 16, 2026

(54) CARTRIDGE AND ELECTRONIC PEN

(71) Applicant: Wacom Co., Ltd., Saitama (JP)

(72) Inventor: Susumu Yamada, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/038,447

(22) Filed: Jan. 27, 2025

(65) Prior Publication Data

US 2025/0244836 A1 Jul. 31, 2025

(30) Foreign Application Priority Data

Jan. 31, 2024 (JP) ................................. 2024-012593

(51) Int. Cl.
*G06F 3/0354* (2013.01)
*G06F 3/038* (2013.01)
*G06F 3/04883* (2022.01)

(52) U.S. Cl.
CPC ........ *G06F 3/03545* (2013.01); *G06F 3/0383* (2013.01); *G06F 3/04883* (2013.01)

(58) Field of Classification Search
CPC . G06F 3/04883; G06F 3/03545; G06F 3/0383
See application file for complete search history.

(56) References Cited

U.S. PATENT DOCUMENTS

2012/0327042 A1* 12/2012 Harley .................. G06F 3/0442
345/179

FOREIGN PATENT DOCUMENTS

WO WO 2017043214 A1 3/2017

* cited by examiner

*Primary Examiner* — Yaron Cohen
(74) *Attorney, Agent, or Firm* — Seed Intellectual Property Law Group LLP

(57) ABSTRACT

Provided is a cartridge used in an electronic pen and housed in a pen body configured as an enclosure of the electronic pen, the cartridge including a first inner electrode and a second inner electrode arranged on the inner surface of a cartridge body configured as an enclosure of the cartridge, a signal source configured to supply a signal to the first inner electrode, and a signal detector configured to detect a signal appearing on the second inner electrode, in which the first inner electrode is coupled capacitively with a first outer electrode arranged inside of the pen body, the second inner electrode is coupled capacitively with a second outer electrode arranged inside of the pen body, and, between the first outer electrode and the second outer electrode, a first signal adjuster is interposed so as to adjust the amount of the signal flowing therebetween.

9 Claims, 6 Drawing Sheets

F I G . 7 A
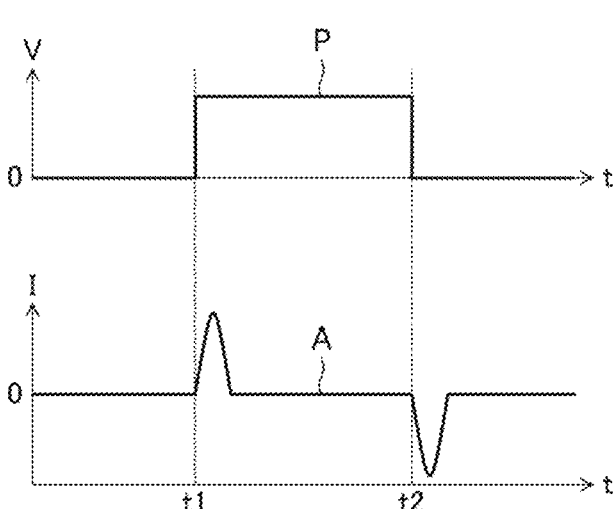
F I G . 7 B
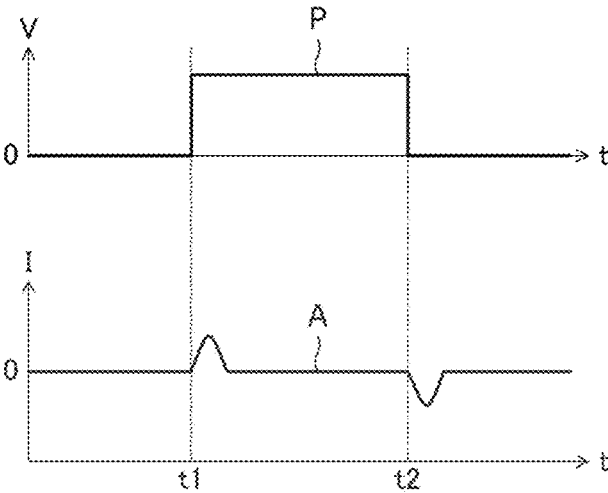
F I G . 7 C
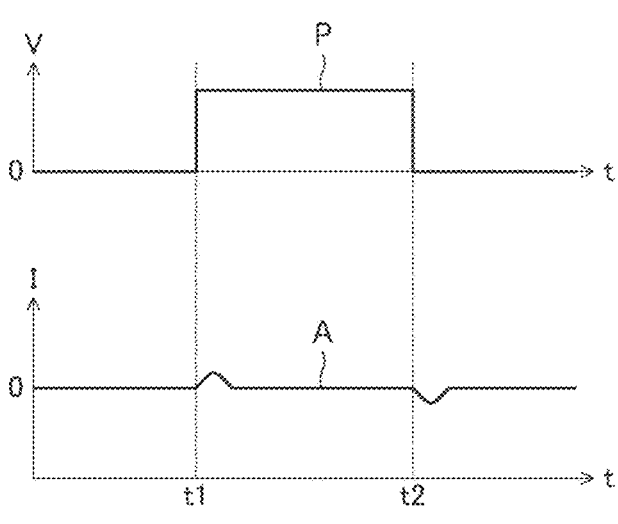

CARTRIDGE AND ELECTRONIC PEN

BACKGROUND

Technical Field

The present disclosure relates to a cartridge and an electronic pen. More particularly, the disclosure relates to a cartridge used in an enclosure of an electronic pen as well as to the electronic pen.

Background Art

There is a known type of electronic pen used to indicate its coordinate position on a position detection apparatus to input coordinate position information thereto, the electronic pen being configured to house a replaceable cartridge (i.e., a refill) similar to that of commercially available ball-point pens. Inside the cartridge are various circuits necessary for implementing the functionality of the electronic pen. In the description below, the enclosure of the electronic pen will be referred to as a "pen body" and the enclosure of the cartridge as a "cartridge body." The cartridge body is sized to fit into the pen body. PCT Patent Publication No. WO2017/043214 discloses an example of this type of electronic pen.

The electronic pen cartridge based on the above background art has terminals penetrating the cartridge body to provide electrical connection between a side switch arranged on the side surface of the pen body on one hand and the circuits inside the cartridge on the other hand. In a case where foreign matter such as moisture or dust intrudes between the pen body and the cartridge body, the intruding foreign matter can flow also into the cartridge through a gap between the terminals and the cartridge body, causing problems.

BRIEF SUMMARY

Therefore, embodiments of the present disclosure provide a cartridge and an electronic pen configured to ensure dustproofing and waterproofing of the cartridge housed inside the pen body.

In carrying out the present disclosure and according to one embodiment thereof, there is provided a cartridge used in an electronic pen and housed in a pen body configured as an enclosure of the electronic pen. The cartridge includes a first inner electrode and a second inner electrode arranged on the inner surface of a cartridge body configured as an enclosure of the cartridge, a signal source that, in operation, outputs a signal to the first inner electrode, and a signal detector that, in operation, detects a signal appearing on the second inner electrode. The first inner electrode is coupled capacitively with a first outer electrode arranged inside of the pen body. The second inner electrode is coupled capacitively with a second outer electrode arranged inside of the pen body. A first signal adjuster is interposed between the first outer electrode and the second outer electrode, and the first signal adjuster, in operation, adjusts an amount of a signal flowing between the first outer electrode and the second outer electrode.

In carrying out the present disclosure and according to another embodiment thereof, there is provided an electronic pen including a pen body configured as an enclosure of the electronic pen, and a cartridge housed and used in the pen body. The cartridge includes a first inner electrode and a second inner electrode arranged on an inner surface of a cartridge body configured as an enclosure of the cartridge, a signal source that, in operation, supplies a signal to the first inner electrode, and a signal detector that, in operation, detects a signal appearing on the second inner electrode. The electronic pen further includes a first outer electrode coupled capacitively with the first inner electrode, a second outer electrode coupled capacitively with the second inner electrode, and a first signal adjuster having a first end connected to the first outer electrode, and a second end connected to the second outer electrode, the first signal adjuster, in operation, adjusts an amount of a signal flowing between the first outer electrode and the second outer electrode.

The present disclosure, when embodied as outlined above, ensures dustproofing and waterproofing of the cartridge housed inside the pen body.

BRIEF DESCRIPTION OF THE SEVERAL VIEWS OF THE DRAWINGS

FIG. 7A is a waveform diagram of the pulse signal supplied from the signal source to the inner electrode and the current detected by the signal detector in the second modification of the first embodiment;

FIG. 7B is another waveform diagram of the pulse signal and the current in the second modification of the first embodiment;

FIG. 7C is yet another waveform diagram of the pulse signal and the current in the second modification of the first embodiment.

DETAILED DESCRIPTION

Embodiments of the present disclosure are described below in detail with reference to the accompanying drawings.

Figure 1:
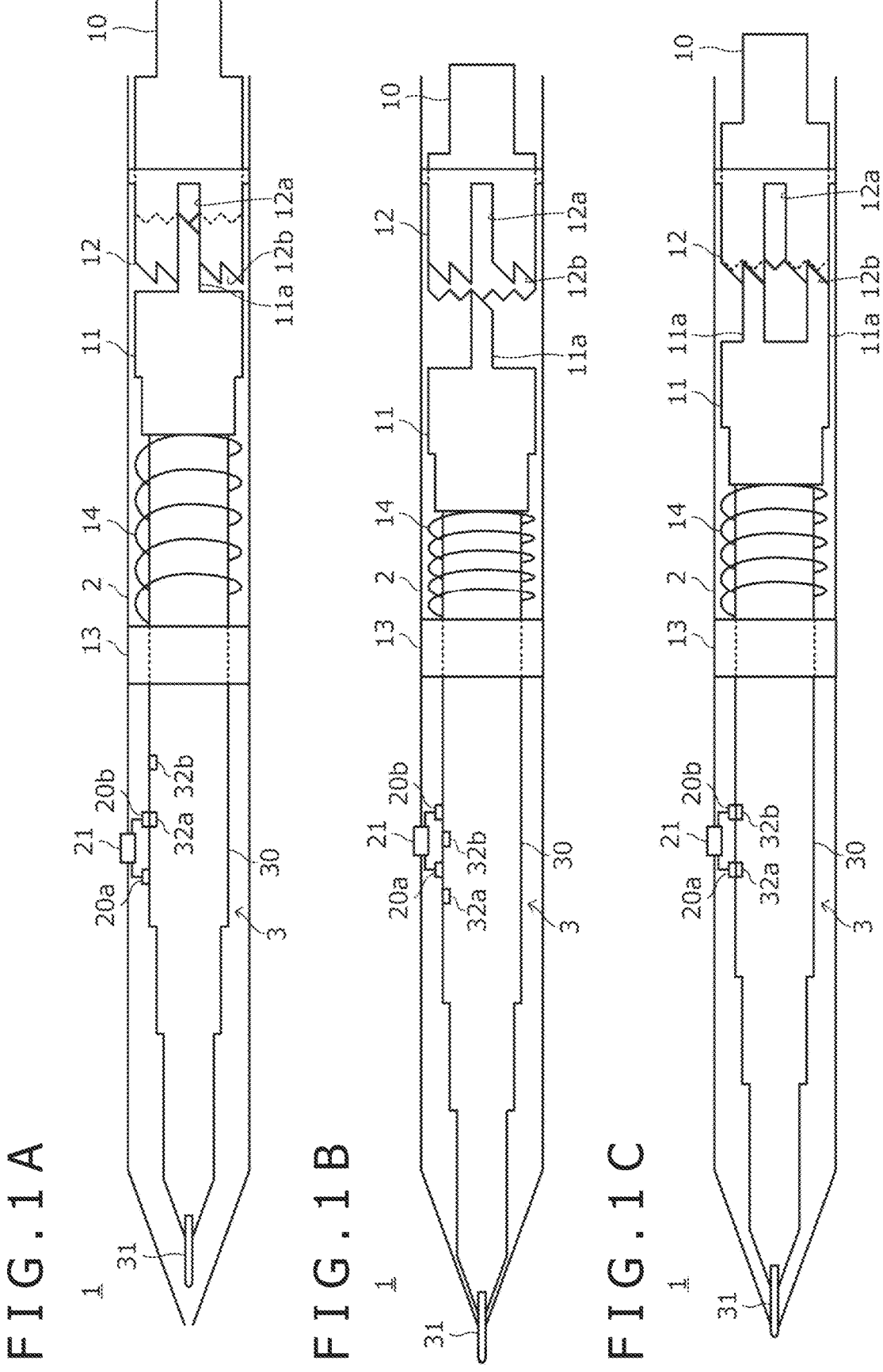
FIG. 1A is a schematic view depicting an electronic pen as a first embodiment of the present disclosure.
FIG. 1B is another schematic view depicting the electronic pen as the first embodiment.
FIG. 1C is yet another schematic view depicting the electronic pen as the first embodiment.

FIGS. 1A to 1C are schematic views depicting an electronic pen 1 as a first embodiment of the present disclosure. As illustrated in these views, the electronic pen 1 is configured to have a knocking rod 10, a rotator 11, a cam body 12, a return spring stopper 13, a return spring 14, outer electrodes 20*a* and 20*b*, a switch 21, and a cartridge 3 inside and on the outside of a pen body 2 constituting an enclosure. The cartridge 3 is a bar-like member configured to be housed inside the pen body 2. The cartridge 3 is configured to have a cartridge body 30, a pen tip 31, and inner electrodes 32*a* and 32*b*.

The knocking rod 10, the rotator 11, the cam body 12, the return spring stopper 13, and the return spring 14 are configured to implement a knocking function. Although structured three-dimensionally, these configurations are illustrated two-dimensionally in FIGS. 1A to 1C, which are schematic plan views for explaining functions.

The knocking rod 10 is a bar-like member with its tip (pen tip end) cut to a mound-shape. The bottom of the knocking rod 10 (pen bottom end) protrudes from the back end of the pen body 2. The rotator 11 is a bar-like member having multiple projections 11*a* at its back end. The rotator 11 is formed rotatably around a pen shaft and has its tip end fixed to the back end of the cartridge body 30. The multiple projections 11*a* are arranged at equal distances apart around the pen shaft.

The cam body 12 is a cylindrical member structured to have two kinds of grooves 12*a* and 12*b* formed alternately with different depths. The grooves 12*a* and 12*b* are also arranged at equal distances around the pen shaft. The bottoms of the relatively shallow grooves 12*b* are taper-shaped. The cam body 12 is configured to be prevented from moving in the pen shaft direction by a stopper, not depicted, and not to rotate around the pen shaft. The knocking rod 10 is inserted into the cam body 12 from the back end side.

The return spring stopper 13 is a donut-shaped member fixed to the pen body 2. The return spring 14 is an elastic body of which one end is arranged to abut against the back end of the return spring stopper 13. The other end of the elastic body is arranged to abut against the tip end of the rotator 11. In this arrangement, the return spring 14 serves to press the rotator 11 toward the pen bottom side. The cartridge body 30 is inserted into the return spring stopper 13 and the return spring 14.

The knocking rod 10 and the rotator 11 are configured to be movable in the pen shaft direction. However, the moving range of the knocking rod 10 to the pen bottom side is limited by the pen body 2, and the moving range of the rotator 11 to the pen tip side is limited by the return spring 14. The rotator 11 is configured to be rotatable around the pen shaft.

FIGS. 1A to 1C each depict the state of the electronic pen 1 brought about when a user presses the knocking rod 10. FIG. 1A indicates an initial state where the projections 1 l*a* of the rotator 11 fit into the relatively deep grooves 12*a* of the cam body 12 while abutting against a tip end mound of the knocking rod 10.

In the state of FIG. 1A, the user presses the knocking rod 10 toward the pen tip side. This causes the tip end of the knocking rod 10 to move toward the pen tip side. The moving tip end of the knocking rod 10 causes the rotator 11 to move toward the pen tip side. FIG. 1B depicts the state in which the knocking rod 10 and the rotator 11 have moved to the pen tip side. When the projections 11*a* of the rotator 11 are fully disengaged from the grooves 12*a* as indicated in FIG. 1B, the projections 11*a* pressed by the return spring 14 toward the pen bottom side slide off the mound of the knocking rod 10, causing the rotator 11 to rotate around the pen shaft. Later, when the user stops pressing the knocking rod 10, the pressing force of the return spring 14 tries to move the rotator 11 toward the pen bottom side. When rotated, however, the rotator 11 has its projections 11*a* fitted not into the initial grooves 12*a* but into the adjacent grooves 12*b* in the rotating direction of the rotator 11. Since the grooves 12*b* are shallower than the grooves 12*a*, the movement of the rotator 11 stops at a position farther to the pen tip side than in the state of FIG. 1A. FIG. 1C depicts the state in which the rotator 11 is thus stopped. Thereafter, when the user again presses the knocking rod 10 toward the pen tip side, operations similar to those described above cause the projections 11*a* of the rotator 11 to fit into the grooves 12*a*, thereby resuming the initial state of FIG. 1A.

As described above, the rotator 11 is fixed to the back end of the cartridge body 30. Thus, the movement of the rotator 11 in the pen shaft direction entails moving the cartridge body 30 in the same direction. The moving range of the rotator 11 in the pen shaft direction and the length of the cartridge body 30 in the same direction are adjusted beforehand in such a manner that the pen tip 31 is fully housed inside the pen body 2 in the initial state of FIG. 1A and that the pen tip 31 protrudes from the tip end of the pen body 2 in the state of FIG. 1C. While the pen tip 31 is protruding from the tip end of the pen body 2, the user is able to write with the electronic pen 1. As a result, repeatedly pressing the knocking rod 10 allows the user to switch between two states, i.e., the state where the electronic pen 1 is usable for writing, and the state where the pen tip 31 is fully housed inside the pen body 2.

The electronic pen 1 is configured to make the cartridge 3 replaceable. Consequently, the knocking rod 10, the rotator 11, and the cam body 12 are configured to be detachable from the pen body 2. When replacing the cartridge 3, the user first detaches the knocking rod 10, the rotator 11, and the cam body 12 from the pen body 2. The user proceeds to remove the cartridge 3 from the back end of the pen body 2. The user then inserts a new cartridge 3 from the back end of the pen body 2. Thereafter, the knocking rod 10, the rotator 11, and the cam body 12 are attached to the pen body 2. This is how the cartridge 3 is replaced.

The outer electrodes 20*a* and 20*b*, the switch 21, and the inner electrodes 32*a* and 32*b* are configured to provide a user-operated on-off switch on the side surface of the electronic pen 1. The outer electrodes 20*a* and 20*b* as well as the switch 21 are fixed to the pen body 2, and the inner electrodes 32*a* and 32*b* are fixed to the cartridge body 30.

The switch 21 is a single-pole-single-throw switch of which one end is connected to the outer electrode 20*a* and of which the other end is connected to the outer electrode 20*b*. The switch 21 is configured to be turned on and off from outside the pen body 2. The user is thus able to turn on and off the switch 21 so as to switch conduction and noncon-nection between the outer electrodes 20*a* and 20*b*. As will be discussed later in detail, the switch 21 is combined with a capacitor formed by the inner electrode 32*a* and outer electrode 20*a* and with a capacitor made of the outer electrode 20*b* and inner electrode 32*b* to form a signal path carrying signals output from a signal source 40, to be described later. When turned on, the switch 21 allows the signals to pass through the signal path; when turned off, the switch 21 prevents the signals from passing through the signal path. In that sense, the switch 21 acts as a signal adjuster adjusting the amount of the signals flowing through the signal path.

As discussed above, the cartridge 3 is configured to move in the pen shaft direction when the knocking rod 10 is pressed by the user. When the cartridge 3 is in the position indicated in FIG. 1C (i.e., writing position), the outer electrode 20*a* and the inner electrode 32*a* face each other across the cartridge body 30, and the outer electrode 20*b* and the inner electrode 32*b* face each other across the cartridge body 30. The cartridge body 30 is formed of a dielectric material. The outer electrode 20*a* and the inner electrode 32*a* facing each other are capacitively coupled using the cartridge body 30 as an inter-electrode dielectric body. The same applies to the outer electrode 20*b* and the inner electrode 32*b*. The capacitive coupling allows the on/off state of the switch 21 of the electronic pen 1 to be transmitted to the circuits inside the cartridge 3 without installing terminals penetrating the cartridge body 30. This point will be discussed later in more detail with reference to the accompanying diagrams of the circuits inside the cartridge 3.

Figure 2:
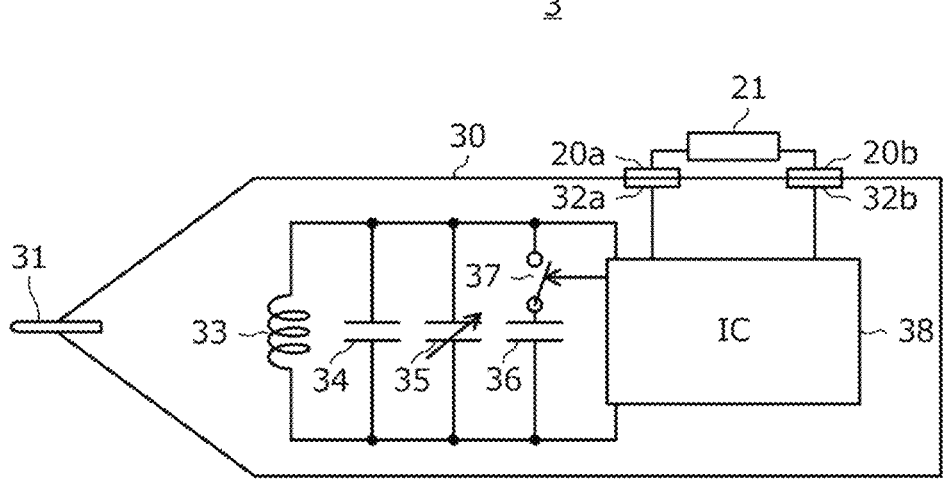
FIG. 2 is a circuit diagram depicting circuits arranged inside a cartridge.

FIG. 2 is a circuit diagram depicting the circuits arranged inside the cartridge 3. This diagram also indicates the outer electrodes 20*a* and 20*b* as well as the switch 21. Whereas what is depicted in FIG. 2 is an example of the electronic pen 1 communicating with a sensor controller inside a position detection apparatus through electromagnetic resonance (EMR), this disclosure can also be applied advantageously to other types of electronic pen 1 such as those operating through the active capacitance.

As depicted in FIG. 2, the cartridge 3 is configured to have a coil 33, a capacitor 34, a variable capacitance capacitor 35, a capacitor 36, a switch 37, and an integrated circuit (IC) 38, in addition to the cartridge body 30, pen tip 31, and inner electrodes 32*a* and 32*b* mentioned above.

The coil 33 and the capacitor 34 are connected in series and make up an LC resonance circuit. The variable capacitance capacitor 35, the capacitor 36, and the IC 38 are connected in parallel with the capacitor 34. The switch 37 is a single-pole-single-throw switch connected serially with the capacitor 36. The variable capacitance capacitor 35 serves to change the resonance frequency of the LC resonance circuit. When the switch 37 is turned on, the capacitor 36 serves to change the resonance frequency of the LC resonance circuit.

When the coil 33 is placed in an alternating magnetic field emitted by sensors inside a touch surface of the position detection apparatus, not depicted, an electromotive force develops across the coil 33. The electromotive force charges the capacitor 34 and accumulates electrical charges in the capacitor 34. The IC 38 is configured to operate using this electromotive force as the operating power. When the alternating magnetic field emitted by the sensors in the position detection apparatus stops, the electrical charges in the capacitor 34 cause the coil 33 to output an alternating magnetic field. By detecting this alternating magnetic field, the sensor controller in the position detection apparatus detects the position of the electronic pen 1 within the touch surface.

Here, the variable capacitance capacitor 35 is configured to have its capacitance changed depending on the pressure (writing pressure) applied to the pen tip 31. In keeping with the on/off state of the switch 21, the switch 37 serves to switch between two states, i.e., whether the capacitor 36 is connected or not connected to the LC resonance circuit formed by the coil 33 and the capacitor 34 (this point will be discussed later in more detail). Thus, the resonance frequency of the LC resonance circuit varies depending on the writing pressure and the on/off state of the switch 21. The sensor controller in the position detection apparatus is configured to acquire the writing pressure and the on/off state of the switch 21 by detecting changes in the frequency of the detected alternating magnetic field.

The IC 38 is an integrated circuit designed to implement various functions of the electronic pen 1. The functions implemented by the IC 38 include a function of detecting the on/off state of the switch 21 and controlling the switch 37 according to the result of the detection. This function is discussed below in detail with reference to the functional block diagram of the IC 38.

Figure 3:
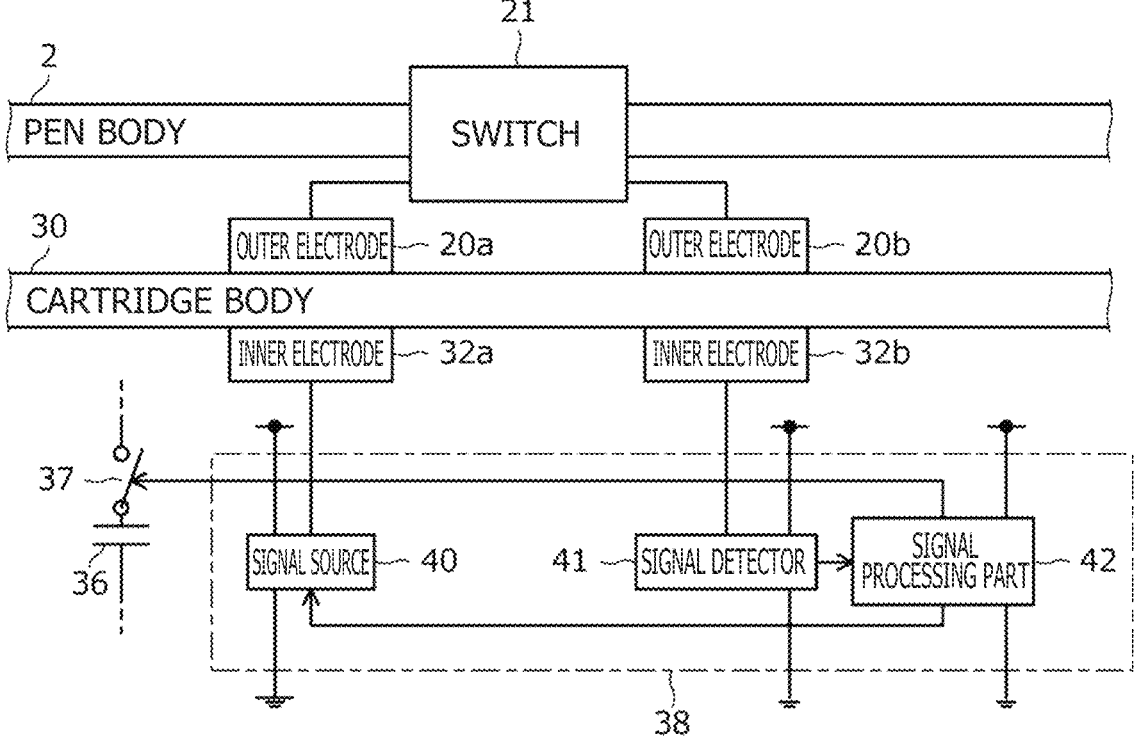
FIG. 3 is a schematic view prepared by adding the functional blocks inside an integrated circuit (IC) to a partial configuration of the electronic pen.

FIG. 3 is a schematic view prepared by adding the functional blocks inside the IC 38 to a partial configuration of the electronic pen 1. As depicted in this schematic view, the IC 38 is configured functionally to have a signal source 40, a signal detector 41, and a signal processing part 42.

The signal source 40 is an oscillator configured to generate a signal including an alternating current component and to supply the generated signal to the inner electrode 32*a*. Although specific details of the signal including the AC component are not determined, the description below assumes that the signal is a rectangular wave pulse signal. The signal detector 41 is a detector configured to detect signals appearing on the inner electrode 32*b*. Whereas a specific type of the signal detector 41 is also not determined, the ensuing description assumes that the signal detector 41 is an ammeter configured to detect currents.

The signal processing part 42 is a processor that implements the various functions of the electronic pen 1 by executing programs stored in a memory, not detected. In this embodiment, the signal processing part 42 causes the signal source 40 to generate the signal including the AC component, acquires from the signal detector 41 the result of detection of the generated signal, and controls turning-on/off of the switch 37 according to the acquired result of the detection.

Figure 4A:
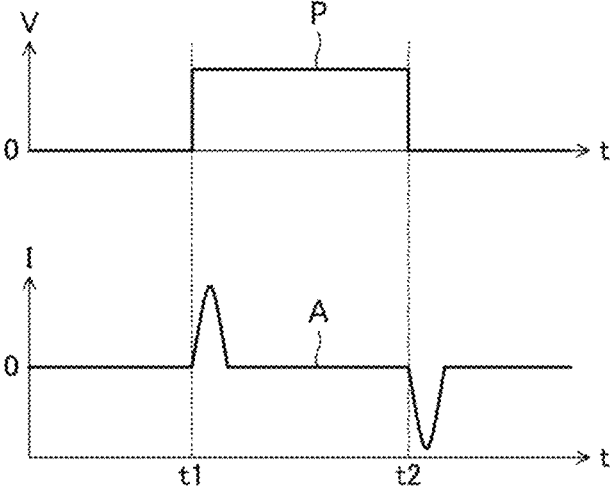
FIG. 4A is a waveform diagram of a pulse signal supplied from a signal source to an inner electrode and a current detected by a signal detector.
Figure 4B:
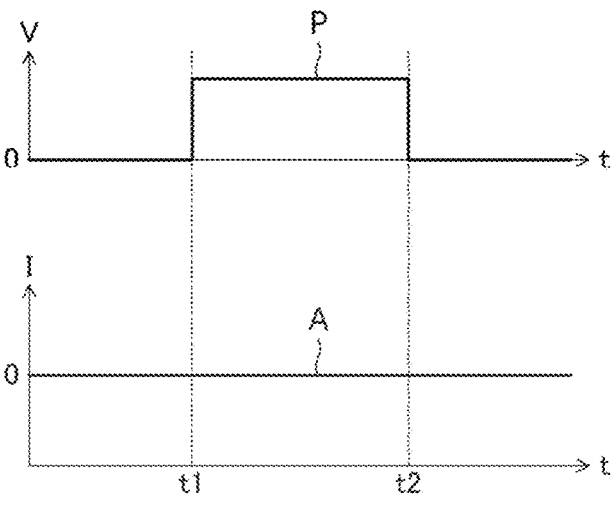
FIG. 4B is another waveform diagram of the pulse signal and the current.

FIGS. 4A and 4B are waveform diagrams of a pulse signal P supplied from the signal source 40 to the inner electrode 32*a* and a current A detected by the signal detector 41. FIG. 4A depicts the case in which the switch 21 is turned on, and FIG. 4B indicates the case where the switch 21 is turned off.

In the example of FIGS. 4A and 4B, times t1 and t2 represent a rising edge and a falling edge of the pulse signal P, respectively. When the switch 21 is turned on, the signal path passing through two capacitors and the switch 21 is formed, one capacitor being made up of the inner electrode 32*a* and the outer electrode 20*a*, the other capacitor being formed of the outer electrode 20*b* and the inner electrode 32*b*. Through this signal path, a current flows in a short time period until the two capacitors are fully charged or fully discharged in response to the rising and falling edges of the pulse signal P, as depicted in FIG. 4A. On the other hand, when the switch 21 is turned off, the signal path above is not formed, so that no current flows therethrough in response to the rising and falling edges of the pulse signal P, as indicated in FIG. 4B.

After causing the signal source 40 to generate the pulse signal, the signal processing part 42 detects the on/off state of the switch 21 on the basis of whether the current A as is indicated in FIG. 4A is detected by the signal detector 41, and controls turning-on/off of the switch 37 according to the result of the detection. As a specific example, when the current A as in FIG. 4A is detected, the signal processing part 42 may detect that the switch 21 is turned on and perform control to turn on the switch 37 accordingly. When the current A as is indicated in FIG. 4A is not detected, the signal processing part 42 may detect that the switch 21 is turned off and perform control to turn off the switch 37 accordingly. In this manner, the on/off state of the switch 21 is reflected on the resonance frequency of the LC resonance circuit and thereby transmitted to the sensor controller.

As discussed above, the electronic pen 1 of the first embodiment utilizes capacitive coupling between the inner electrodes 32a and 32b on one hand and the outer electrodes 20a and 20b on the other hand to transmit the on/off state of the switch 21 to the signal processing part 42 in the cartridge 3. In turn, the signal processing part 42 allows the transmitted on/off state of the switch 21 to be reflected on the resonance frequency of the LC resonance circuit. This makes it possible to implement the side switch without providing terminals penetrating the cartridge body 30. As a result, the electronic pen 1 of this embodiment ensures dustproofing and waterproofing of the cartridge 3 inside the pen body 2.

Figure 5:
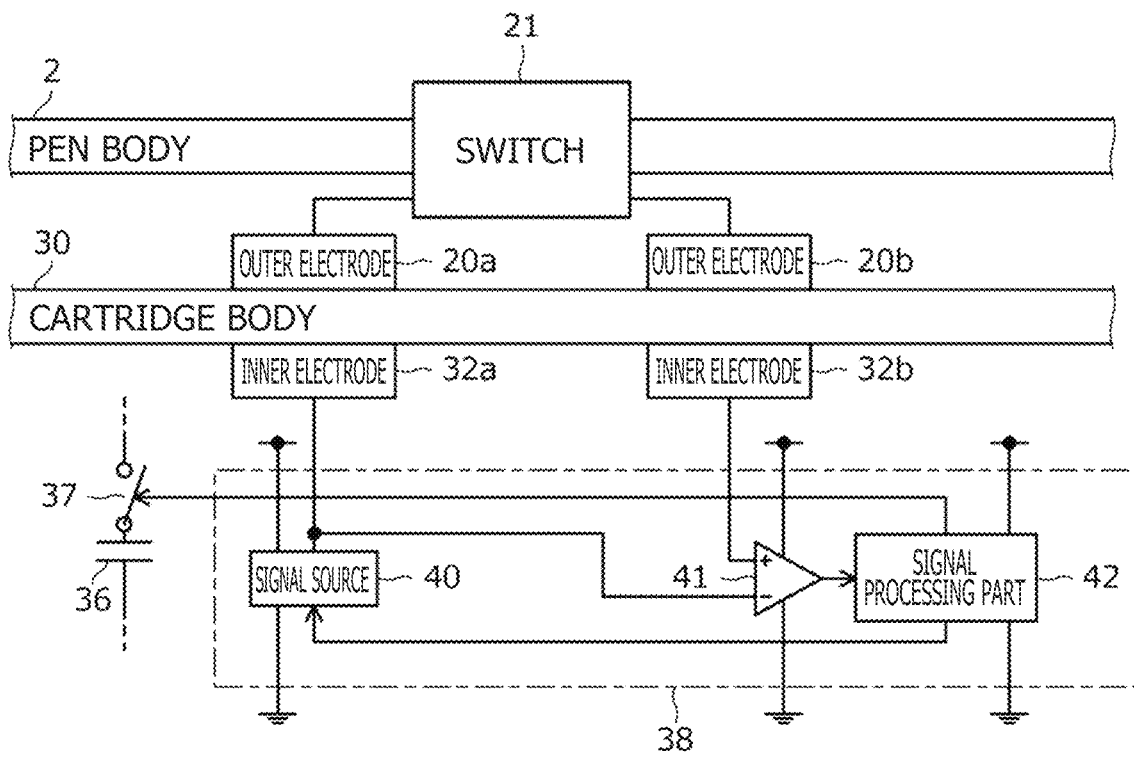
FIG. 5 is a schematic view prepared by adding the functional blocks inside the IC to a partial configuration of the electronic pen as a first modification of the first embodiment.

FIG. 5 is a schematic view prepared by adding the functional blocks inside the IC 38 to a partial configuration of the electronic pen 1 as a first modification of the first embodiment. Comparing FIG. 5 with FIG. 3 reveals that the electronic pen 1 of the first modification differs from the electronic pen 1 of this embodiment in that a comparator is used in place of the ammeter as the signal detector 41.

The signal detector 41 as the comparator has a non-inverting input terminal, an inverting input terminal, and an output terminal. The signal detector 41 is a circuit that outputs "0" from the output terminal when the potential difference between the non-inverting input terminal and the inverting input terminal is less than a predetermined value, and outputs "1" from the output terminal when the potential difference between the non-inverting input terminal and the inverting input terminal is equal to or larger than the predetermined value. As depicted in FIG. 5, the non-inverting input terminal of the signal detector 41 is connected to the inner electrode 32b, the inverting input terminal is connected to the signal source 40, and the output terminal is connected to the signal processing part 42.

When the switch 21 is turned off, the above-described signal path is not formed. That means the voltage on the non-inverting input terminal stays low and unchanged even when the signal source 40 outputs the pulse signal. As a result, the signal detector 41 outputs "1" while the signal source 40 is outputting the pulse signal and outputs "0" otherwise. On the other hand, when the switch 21 is turned on, the signal path is formed. Consequently, the voltage on the non-inverting input terminal of the signal detector 41 increases temporarily in the positive direction at a rising edge of the pulse signal, before decreasing gradually. At a falling edge of the pulse signal, the voltage increases temporarily in the negative direction, before gradually decreasing. As a result, the signal detector 41 outputs "1" a little later than the rising edge of the pulse signal, and outputs "0" slightly later than the falling edge of the pulse signal. The signal processing part 42 in this modification detects the on/off state of the switch 21 by detecting those differences in the output of the signal detector 41 which are attributable to the state of the switch 21. The processing following detection of the on/off state of the switch 21 (i.e., control of the switch 37) is similar to that of the first embodiment.

As discussed above, the electronic pen 1 of the first modification also utilizes capacitive coupling between the inner electrodes 32a and 32b on one hand and the outer electrodes 20a and 20b on the other hand to transmit the on/off state of the switch 21 to the signal processing part 42 in the cartridge 3. The signal processing part 42 in turn allows the transmitted on/off state of the switch 21 to be reflected on the resonance frequency of the LC resonance circuit. This makes it possible to implement the side switch without providing terminals penetrating the cartridge body 30. As a result, the electronic pen 1 of the first modification ensures dustproofing and waterproofing of the cartridge 3 inside the pen body 2.

Whereas the ammeter is used as the signal detector 41 in this embodiment and the comparator is used as the signal detector 41 in the first modification, a device other than the ammeter or the comparator may be adopted as the signal detector 41 as long as the device is capable of detecting that the signal supplied from the signal source 40 to the inner electrode 32a has reached the inner electrode 32b. For example, a voltmeter or an oscilloscope may be used as the signal detector 41.

In addition, a bias circuit may be connected to the non-inverting input terminal of the signal detector 41. This is effective to configure a level of a signal supplied to the signal detector 41.

Alternatively, the route from the signal source 40 to the inner electrode 32a and the route from the signal source 40 to the inverting input terminal of the signal detector 41 can be separated from each other so as to supply different signals to each of the routes.

Figure 6:
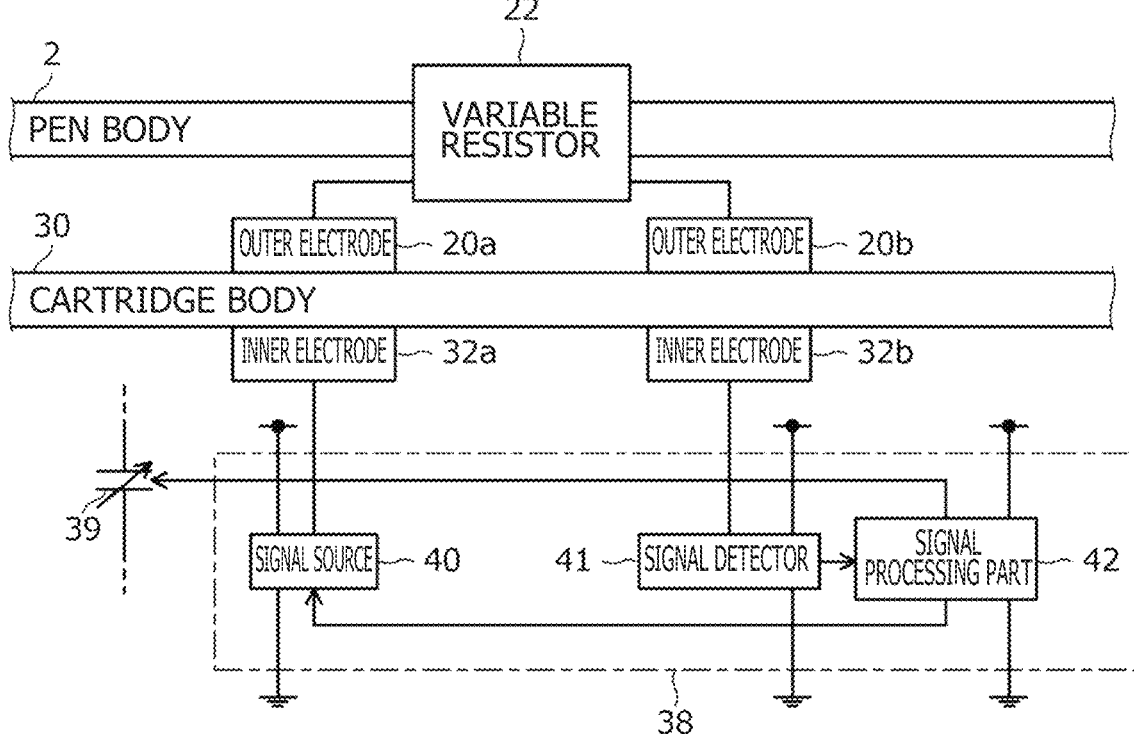
FIG. 6 is a schematic view prepared by adding the functional blocks inside the IC to a partial configuration of the electronic pen as a second modification of the first embodiment.

FIG. 6 is a schematic view prepared by adding the functional blocks inside the IC 38 to a partial configuration of the electronic pen 1 as a second modification of the first embodiment. Comparing FIG. 6 with FIG. 3 reveals that the electronic pen 1 of the second modification differs from the electronic pen 1 of the first embodiment in that a variable resistor 22 is used in place of the switch 21 and that a variable capacitance capacitor 39 is used in place of the serial circuit formed by the capacitor 36 and the switch 37.

The variable resistor 22 is an electronic component configured to change its resistance value in multiple steps in response to the user's operations. In this modification, the side switch of the electronic pen 1 is configured not by the switch 21 but by the variable resistor 22. In this case, the side switch acts as a volume switch configured to change its status in multiple steps. As with the switch 21, the variable resistor 22 constitutes the signal path for the signal output from the signal source 40 in combination with the capacitor formed by the inner electrode 32a and the outer electrode 20a and with the capacitor made up of the outer electrode 20b and the inner electrode 32b. The variable resistor 22 functions as a signal adjuster that adjusts, on the basis of the resistance value, the amount of the signal flowing through the signal path.

The variable capacitance capacitor 39 is an electronic component configured to change its capacitance value in multiple steps under control of the signal processing part 42. The number of the steps of the variable capacitance capacitor 39 should preferably be the same as or larger than that of the variable resistor 22. The signal processing part 42 is configured beforehand to store the steps (capacitance value steps) of the variable capacitance capacitor 39 in correspondence with each of the steps (resistance value steps) of the variable resistor 22.

FIGS. 7A to 7C are waveform diagrams of the pulse signal P supplied from the signal source 40 to the inner electrode 32a and the current A detected by the signal detector 41 in the second modification. FIG. 7A depicts the case where the resistance value of the variable resistor 22 is smaller than in the case of FIG. 7B, and FIG. 7B indicates the case where the resistance value of the variable resistor 22 is smaller than in the case of FIG. 7C. These diagrams reveal that the smaller the resistance value of the variable resistor 22, the larger the maximum value of the current A detected by the signal detector 41 becomes. Thus, the signal processing part 42 in this embodiment acquires the maximum value of the current A detected by the signal detector 41 and, on the basis of the acquired value, determines the current step of the variable capacitance capacitor 39. The signal processing part 42 proceeds to acquire the step of the variable capacitance capacitor 39 stored in correspondence with the currently determined step of the variable capacitance capacitor 39. The signal processing prat 42 then controls the capacitance value of the variable capacitance capacitor 39 in such a manner that it coincides with the capacitance value indicated by the acquired step. This makes it possible to have the resistance value of the variable resistor 22 reflected on the resonance frequency of the LC resonance circuit, thereby transmitting the resistance value to the sensor controller.

As discussed above, the electronic pen 1 of the second modification utilizes capacitive coupling between the inner electrodes 32a and 32b on one hand and the outer electrodes 20a and 20b on the other hand to transmit the resistance value of the variable resistor 22 to the signal processing part 42 in the cartridge 3. In turn, the signal processing part 42 causes the transmitted resistance value of the variable resistor 22 to be reflected on the resonance frequency of the LC resonance circuit. This makes it possible to implement the side switch as a volume switch without providing terminals penetrating the cartridge body 30. As a result, the electronic pen 1 of the second modification ensures dustproofing and waterproofing of the cartridge 3 inside the pen body 2 when a volume switch is used as the side switch.

Figure 8:
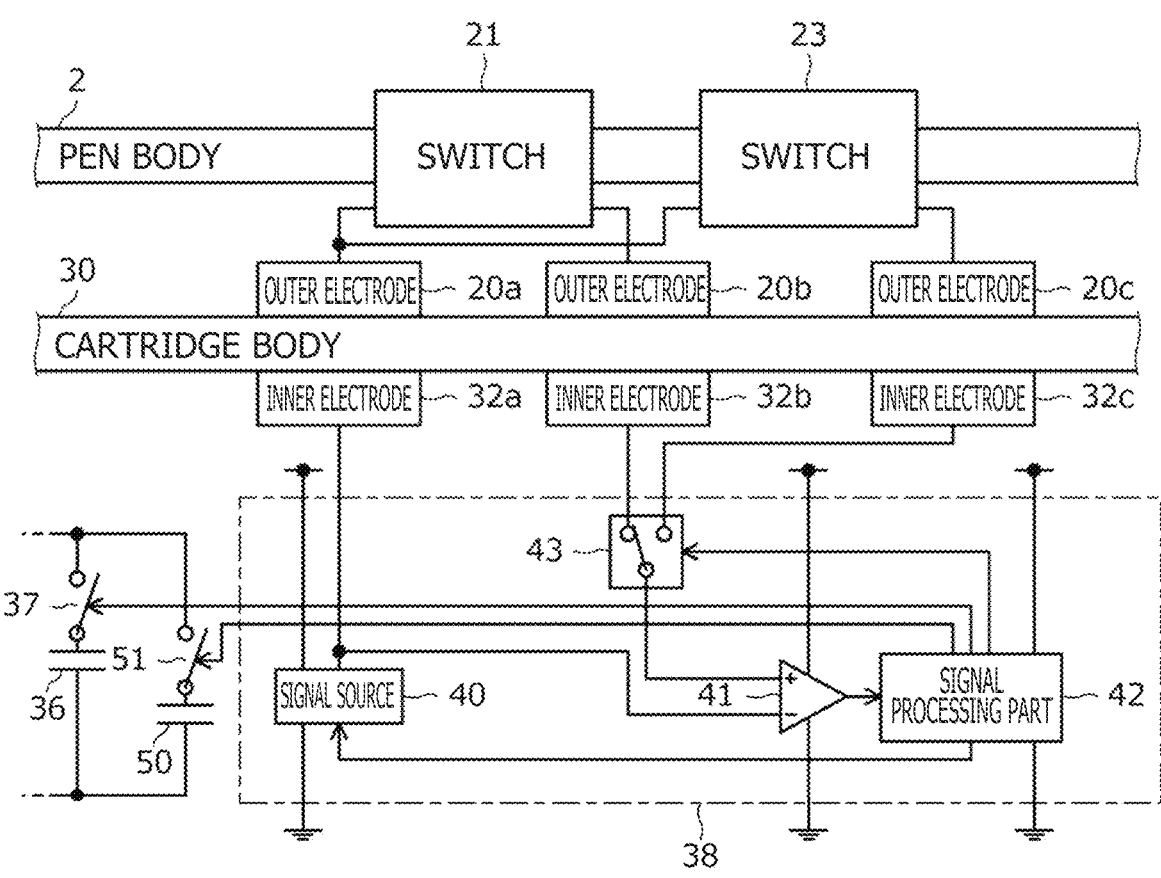
FIG. 8 is a schematic view prepared by adding the functional blocks inside the IC to a partial configuration of the electronic pen as a second embodiment of the present disclosure.

FIG. 8 is a schematic view prepared by adding the functional blocks inside the IC 38 to a partial configuration of the electronic pen 1 as a second embodiment of the present disclosure. Comparing FIG. 8 with FIG. 5 reveals that the electronic pen 1 of the second embodiment differs from the electronic pen 1 of the first modification of the first embodiment in that an outer electrode 20c, a switch 23, an inner electrode 32c, a capacitor 50, a switch 51, and a switch 43 are added. The remaining components in the electronic pen 1 of the second embodiment are similar to those in the electronic pen 1 of the first modification of the first embodiment. Thus, the description below will focus on the differences between the electronic pen 1 of the second embodiment and the electronic pen 1 of the first modification of the first embodiment.

As with the outer electrodes 20a and 20b, the outer electrode 20c is fixed to the pen body 2. The switch 23 is a single-pole-single-throw switch of which one end is connected to the outer electrode 20a and of which the other end is connected to the outer electrode 20c. As with the switch 21, the switch 23 is configured to be turned on and off from outside the pen body 2. In the second embodiment, the switches 21 and 23 constitute the side switches of the electronic pen 1. As with the inner electrodes 32a and 32b, the inner electrode 32c is fixed to the cartridge body 30.

When the cartridge 3 is positioned as depicted in FIG. 1C, the outer electrode 20c and the inner electrode 32c are arranged to face each other across the cartridge body 30. The outer electrode 20c and the inner electrode 32c facing each other are capacitively coupled through the cartridge body 30 serving as an inter-electrode dielectric body.

As with the capacitor 36, the capacitor 50 is connected in parallel with the capacitor 34 depicted in FIG. 2. The switch 51 is a single-pole-single-throw switch connected serially to the capacitor 50. When the switch 51 is turned on, the capacitor 50 serves to change the resonance frequency of the LC resonance circuit made up of the coil 33 and capacitor 34 indicated in FIG. 2. The capacitance value of the capacitor 36 and that of the capacitor 50 should preferably be different from each other.

The switch 43 is a single-pole-single-throw switch incorporated in the IC 38. The switch 43 is configured to have a select terminal connected to the inner electrode 32b, a select terminal connected to the inner electrode 32c, and a common terminal connected to the non-inverting input terminal of the signal detector 41 acting as a comparator. The on/off state of the switch 43 is controlled by the signal processing part 42.

The signal processing part 42 in the second embodiment causes the signal source 40 to generate the signal including the alternative current (AC) component, acquires from the signal detector 41 the result of detection of the generated signal, and performs, on each of the switches 21 and 23, a process of controlling the resonance frequency of the LC resonance circuit according to the acquired result on a time-sharing basis. More specifically, the signal processing part 42 first sets the switch 43 to the side of the inner electrode 32b, causes the signal source 40 to output the pulse signal P in this state, and acquires the current A detected by the signal detector 41. On the basis of the acquired current A, the signal processing part 42 detects the on/off state of the switch 21 and controls the on/off state of the switch 37 according to the detected state. The signal processing part 42 proceeds to set the switch 43 to the side of the inner electrode 32c, causes the signal source 40 to output the pulse signal P in this state, and acquires the current A detected by the signal detector 41. On the basis of the acquired current A, the signal processing part 42 detects the on/off state of the switch 23, and controls the on/off state of the switch 51 according to the detected state. The signal processing part 42 carries out the above time-sharing processing by repeating the detailed steps above.

As explained above, the electronic pen 1 of the second embodiment utilizes capacitive coupling between the inner electrodes 32a and 32b on one hand and the outer electrodes 20a and 20b on the other hand to transmit the on/off state of the switch 21 and that of the switch 23 to the signal processing part 42 in the cartridge 3. In turn, the signal processing part 42 allows the transmitted on/off state of the switch 21 and that of the switch 23 to be reflected on the resonance frequency of the LC resonance circuit. This makes it possible to implement the multiple side switches without providing terminals penetrating the cartridge body 30. As a result, the electronic pen 1 of the second embodiment ensures dustproofing and waterproofing of the cartridge 3 inside the pen body 2 when the multiple side switches are used.

The second embodiment has been explained above using a comparator as the signal detector 41, for example. Alternatively, as discussed in conjunction with the first embodiment, the signal detector 41 may be a device other than the comparator as long as the device is capable of detecting that the signal supplied from the signal source 40 to the inner electrode 32a has reached the inner electrodes 32b and 32c. For example, an ammeter, a voltmeter, or an oscilloscope may be used as the signal detector 41.

In addition, a bias circuit may be connected to the non-inverting input terminal of the signal detector 41. This is effective to configure a level of a signal supplied to the signal detector 41.

Alternatively, the route from the signal source 40 to the inner electrode 32a and the route from the signal source 40 to the inverting input terminal of the signal detector 41 can be separated from each other so as to supply different signals to each of the routes.

Alternatively, the IC 38 may include a plurality of signal sources 40 each corresponding to the switch 21 and switch 23, and each of the signal sources 40 may supply different signals from each other. The on/off state of the switch 21 and switch 23 can be detected based on the signal received by the signal processing part 42. In this case, the IC 38 may comprise multiple signal sources 40 and a single signal processing part 42 that received signals from each of the multiple signal sources 40.

The present disclosure is not limited to the preferred embodiments discussed above and may be implemented in diverse modifications so far as they are within the scope of this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A cartridge used in an electronic pen and housed in a pen body configured as an enclosure of the electronic pen, the cartridge comprising:
    a first inner electrode and a second inner electrode arranged on an inner surface of a cartridge body configured as an enclosure of the cartridge;
    a signal source that, in operation, outputs a signal to the first inner electrode; and
    a signal detector that, in operation, detects a signal appearing on the second inner electrode,
    wherein the first inner electrode is coupled capacitively with a first outer electrode arranged inside of the pen body,
    wherein the second inner electrode is coupled capacitively with a second outer electrode arranged inside of the pen body, and,
    wherein a first signal adjuster is interposed between the first outer electrode and the second outer electrode, and
    wherein the first signal adjuster, in operation, adjusts an amount of a signal flowing between the first outer electrode and the second outer electrode.

2. The cartridge according to claim 1, wherein the signal output by the signal source includes an alternating current component.

3. The cartridge according to claim 1, wherein the cartridge body includes a dielectric material.

4. The cartridge according to claim 1, wherein the first signal adjuster includes a switch interposed between the first outer electrode and the second outer electrode.

5. The cartridge according to claim 1, wherein the first signal adjuster includes a variable resistor interposed between the first outer electrode and the second outer electrode.

6. The cartridge according to claim 1, wherein the first signal adjuster is configured to be operable from outside the pen body.

7. The cartridge according to claim 1, further comprising:
    a third inner electrode arranged on the inner surface of the cartridge body,
    wherein the third inner electrode is coupled capacitively with a third outer electrode arranged inside of the pen body,
    wherein a second signal adjuster is interposed between the first outer electrode and the third outer electrode,
    wherein the second signal adjuster, in operation, adjusts an amount of a signal flowing between the first outer electrode and the third outer electrode, and
    wherein the signal detector, in operation, detects the signal appearing on the third inner electrode.

8. An electronic pen comprising:
    a pen body configured as an enclosure of the electronic pen; and
    a cartridge housed and used in the pen body,
    wherein the cartridge includes:
        a first inner electrode and a second inner electrode arranged on an inner surface of a cartridge body configured as an enclosure of the cartridge,
        a signal source that, in operation, supplies a signal to the first inner electrode, and
        a signal detector that, in operation, detects a signal appearing on the second inner electrode;
    a first outer electrode coupled capacitively with the first inner electrode;
    a second outer electrode coupled capacitively with the second inner electrode; and
    a first signal adjuster having a first end connected to the first outer electrode, and a second end connected to the second outer electrode,
    wherein the first signal adjuster, in operation, adjusts an amount of a signal flowing between the first outer electrode and the second outer electrode.

9. The electronic pen according to claim 8, wherein the first and the second outer electrodes and the first and the second inner electrodes are arranged such that, in a case where the cartridge is brought to a writing position by a knocking function of the electronic pen, the first outer electrode and the second inner electrode face each other across the cartridge body, and the second outer electrode and the second inner electrode face each other across the cartridge body.

* * * * *